(12) United States Patent
Limongi et al.

(10) Patent No.: US 10,492,589 B2
(45) Date of Patent: Dec. 3, 2019

(54) APPLICATOR HAVING A STEM WITH A THREE-DIMENSIONAL PROFILE

(71) Applicant: L'OREAL, Paris (FR)

(72) Inventors: Michel Limongi, Clichy (FR); Vincent Jacquart, Paris (FR)

(73) Assignee: L'OREAL, Paris (FR)

( * ) Notice: Subject to any disclaimer, the term of this patent is extended or adjusted under 35 U.S.C. 154(b) by 461 days.

(21) Appl. No.: 14/764,278

(22) PCT Filed: Jan. 27, 2014

(86) PCT No.: PCT/EP2014/051523
§ 371 (c)(1),
(2) Date: Jul. 29, 2015

(87) PCT Pub. No.: WO2014/118124
PCT Pub. Date: Aug. 7, 2014

(65) Prior Publication Data
US 2015/0359317 A1  Dec. 17, 2015

(30) Foreign Application Priority Data

Jan. 30, 2013  (FR) ...................................... 13 50797

(51) Int. Cl.
*A45D 40/26* (2006.01)
*A45D 34/04* (2006.01)
(Continued)

(52) U.S. Cl.
CPC ........... *A45D 40/262* (2013.01); *A45D 34/04* (2013.01); *A45D 34/045* (2013.01); *A45D 40/20* (2013.01);
(Continued)

(58) Field of Classification Search
CPC .. A45D 40/265; A45D 40/264; A45D 40/262; A45D 34/042; A45D 34/043;
(Continued)

(56) References Cited

U.S. PATENT DOCUMENTS 4,109,339 A * 8/1978 Dietrich ................... A46B 5/02
                                                           15/143.1
4,165,755 A    8/1979 Cassai
(Continued)

FOREIGN PATENT DOCUMENTS

EP   0916282 A1   5/1999
FR   2738466 A1   3/1997
(Continued)

OTHER PUBLICATIONS

International Search Report for PCT/EP2014/051523 (dated Apr. 11, 2014).

(Continued)

*Primary Examiner* — Tatiana L Nobrega
(74) *Attorney, Agent, or Firm* — The Marbury Law Group, PLLC

(57) ABSTRACT

The subject of the invention is a cosmetic applicator, in particular for the eyelashes or the contour of the eyes, comprising:
  a gripping member,
  an applicator element,
  a stem connecting the gripping member and the applicator element, the axis of the stem extending in all three dimensions of space.

9 Claims, 4 Drawing Sheets

Figures 1, 2:
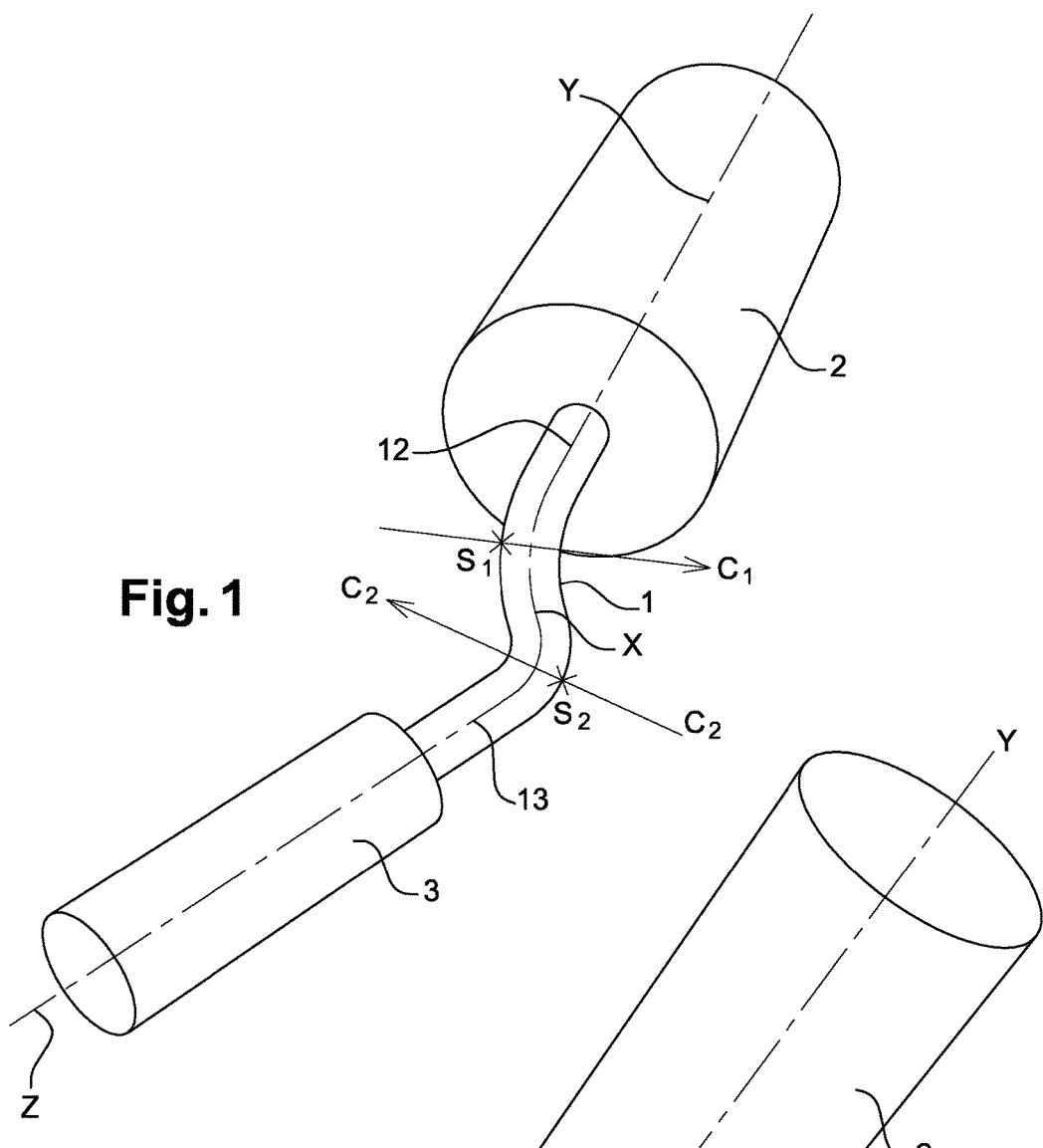

(51) Int. Cl.
  *A45D 40/20* (2006.01)
  *B29C 45/00* (2006.01)
  *A46B 9/02* (2006.01)
  *B29K 101/00* (2006.01)
  *B29L 31/00* (2006.01)

(52) U.S. Cl.
  CPC ........... *A45D 40/26* (2013.01); *A45D 40/265* (2013.01); *B29C 45/00* (2013.01); *A45D 2200/1009* (2013.01); *A45D 2200/1072* (2013.01); *A46B 9/021* (2013.01); *A46B 2200/1053* (2013.01); *B29C 2045/0093* (2013.01); *B29K 2101/00* (2013.01); *B29L 2031/7739* (2013.01)

(58) Field of Classification Search
  CPC .. A45D 34/045; A45D 40/261; A45D 40/267; A45D 40/268; A45D 40/26; A45D 34/041; A45D 34/046; A45D 34/047; A45D 34/048; A45D 34/04; A46B 9/021; A46B 2200/1053; A46B 2200/106
  USPC .......................................................... D4/138
  See application file for complete search history.

(56) References Cited

U.S. PATENT DOCUMENTS

| | | | | |
|---|---|---|---|---|
| 4,428,388 A * | 1/1984 | Cassai | ................. | A46B 9/021 132/218 |
| 4,463,470 A * | 8/1984 | Willis | ................. | A46B 9/04 132/325 |
| 5,522,109 A * | 6/1996 | Chan | ................. | A46B 5/0016 15/106 |
| 6,033,143 A * | 3/2000 | Gueret | ................. | A45D 34/045 401/126 |
| 6,050,273 A | 4/2000 | Lhuisset | | |
| 6,220,254 B1 | 4/2001 | Gueret | | |
| 6,309,125 B1 * | 10/2001 | Peters | ................. | A46B 11/0006 401/126 |
| 6,532,967 B1 * | 3/2003 | Dumler | ................. | A46B 9/021 132/218 |
| 7,866,327 B1 | 1/2011 | Gueret | | |
| 8,070,374 B2 * | 12/2011 | Gueret | ................. | A45D 34/045 401/126 |
| 8,454,097 B2 * | 6/2013 | Gueret | ................. | A45D 34/045 132/218 |
| 2004/0035437 A1 * | 2/2004 | Gueret | ................. | A45D 40/267 132/218 |
| 2005/0031401 A1 * | 2/2005 | Gueret | ................. | A45D 34/045 401/129 |
| 2007/0000513 A1 * | 1/2007 | Gueret | ................. | A45D 34/045 132/313 |
| 2008/0107470 A1 * | 5/2008 | Gueret | ................. | A45D 40/265 401/129 |
| 2012/0219350 A1 * | 8/2012 | Han | ................. | A46B 5/0095 401/268 |
| 2012/0312315 A1 * | 12/2012 | Gueret | ................. | A45D 34/045 132/200 |

FOREIGN PATENT DOCUMENTS

| | | |
|---|---|---|
| GB | 2284542 A | 6/1995 |
| JP | 07-204031 A | 8/1995 |
| JP | 2005-237395 A | 9/2005 |

OTHER PUBLICATIONS

Japanese Office Action in related Japanese Application No. 2015-555666 dated Dec. 6, 2017.

* cited by examiner

APPLICATOR HAVING A STEM WITH A THREE-DIMENSIONAL PROFILE

This is a national stage application of PCT/EP2014/051523, filed internationally on Jan. 27, 2014, which claims priority to French Application 1350797, filed on Jan. 30,2013.

The present invention relates to applicators having a gripping member, an applicator element and a stem connecting the gripping member and the applicator element.

In particular, the invention relates to applicators for cosmetic products for making up or caring for the skin, in particular mascaras and eyeliners.

In order to make the application of the cosmetic product easier, applicators have already been proposed in which the gripping member, the stem and the applicator element do not extend entirely along one and the same rectilinear axis.

Thus, the patent U.S. Pat. No. 4,165,755 proposes an applicator in which the stem has, at its distal end, an articulated part to which the applicator element is secured.

U.S. Pat. No. 7,866,327 discloses an applicator in which the applicator element forms a non-zero angle with the stem and has a body and/or a core that is capable of elastically deforming.

EP 916 282 discloses an applicator in which the stem or the applicator element is curved or bent such that the applicator element is off-axis with respect to the stem.

FR 2 738 466 discloses an applicator of which the stem has a curved shape in order to negotiate anatomical obstacles of the face that are located in the vicinity of the zone to be made up.

In all of these documents, the stem of the applicator defines a two-dimensional profile.

For this reason, the ergonomics of known applicators are not optimal, in particular in the case of mascara applicators.

In particular, it is more difficult to access the eyelashes located on the lower eyelid than those on the upper eyelid.

Moreover, for each eyelid, it is more difficult to access the eyelashes located close to the corners of the eye (known as "eyelashes of the outer third" and "eyelashes of the inner third") than those located in the central zone of the eye (known as "eyelashes of the central third").

It is also more difficult to access the bases of the eyelashes and the free ends of the eyelashes (known as "eyelash ends") than the central region of the eyelashes.

In addition, with current mascara applicators or eyeliners, if the person uses the same hand to make up both eyes, she has to negotiate the obstacle of the nose by using the agility of her wrist, her hand or her shoulder. These hand movements are not comfortable.

If she switches her hand for each eye, the makeup risks not being symmetrical. This is because a right-handed person often succeeds better in making up the right eye than the left eye. A left-handed person often succeeds better in making up the left eye than the right eye.

Consequently, the result is not sufficiently regular and symmetrical when the person applies her makeup herself.

In the case of making up the eyes and in particular the eyelashes, there exists a need to improve the ergonomics of known applicators such that:
   the two eyes can be made up symmetrically with the same hand without making the effort of twisting the wrist, the hand or the shoulder,
   all the eyelashes, located both in the inner region and in the outer regions, can be made up equally easily, from their root to their tip.

The subject of the invention is a cosmetic applicator, in particular for the eyelashes or the contour of the eyes, comprising:
   a gripping member,
   an applicator element,
   a stem connecting the gripping member and the applicator element, the axis of the stem extending in all three dimensions of space.

By virtue of the particular configuration of the applicator according to the invention, it is possible to make up both eyes easily without switching hands. It is also possible to access the lower eyelid effortlessly. Finally, for each eyelid, it is possible to reach the three regions of the eyelashes and the base and the end of each eyelash equally well.

A further subject of the invention is a device for packaging and applying a cosmetic product, in particular for the eyelashes or the contour of the eyes, having a container containing the product and an applicator as defined above.

This device is much more ergonomic than those of the prior art. This is because the user can make up her two eyes while holding the container in one and the same hand.

A further subject of the invention is a cosmetic makeup process for the eyelashes or the contour of the eyes, comprising the employment of the applicator as defined above.

With the process according to the invention, the look is intensified, the elongation and combing of the eyelashes are optimal, and the loading potential and curling potential are at a maximum.

The Stem

The expression "axis of the stem" is understood to mean the curve connecting all of the centres of mass of the cross sections of the stem. The axis of the stem describes a curve extending in all three dimensions of space.

It is said that "the axis of the stem extends in all three dimensions of space" if it can be contained in a volume and not in a plane. In other words, the axis of the stem has a three-dimensional profile. It is also possible to say that the axis of the stem occupies all three dimensions of space.

Advantageously, the stem is designed such that the angle between the longitudinal axis of the gripping member and the longitudinal axis of the applicator element is between 25° and 90° and preferably close to 90°.

This angular range, combined with the geometry of the stem, is optimal for positioning the applicator element ideally and easily accessing the eyelashes at the corners of the eye while favouring a homogeneous finish to the makeup on the row of eyelashes.

More advantageously, the stem has at least two bends.

The bends of the stem allow the applicator element to adapt (in terms of the position and use of the makeup) to the contour of the eyes and allow the stem to adapt further to the shape of the face, in particular to the volume of the nose and the cheekbones.

In addition, the bends of the stem make it possible to stir the formulation in the container with the stem and the applicator element. This stirring takes place upon each use or as desired by the consumer. It eliminates the hollow chimney phenomenon (drying of the formulation along the walls of the container) that is encountered in most of the mascaras that are currently known.

Preferably, the stem has a first bend that is concave towards a first side and a second bend that is concave towards a second side opposite the first side, the first bend more preferably being different from the second bend.

The first and second bends may in particular differ from one another by the nature of their curve or by their radius of curvature. According to the invention, when the bend does not correspond to a circular arc, the "radius of curvature is measured at the apex of the bend".

Advantageously, the axis of the stem has a first rectilinear portion connected to the gripping member.

This rectilinear portion makes it easier to remove the stem from and introduce it into the bottle.

Optionally, the axis of the stem has a second rectilinear portion connected to the applicator element.

The purpose of this rectilinear portion is to accommodate the core of the applicator element, and it must preferably be as short as possible or non-existent.

Even more advantageously, the first rectilinear portion and the second rectilinear portion do not extend along one and the same rectilinear axis.

The stem is advantageously elastically deformable.

In this case, it makes it easier to remove the stem from and introduce it into the bottle.

The expression "elastically deformable" should be understood as meaning that the material has a certain shape memory. The expression "elastically deformable" should be understood to have a broad meaning and covers in particular the case in which the stem, after having been deformed, returns by elasticity to a position which is not strictly identical to its initial position, taking into account, for example, the nature of the material used.

More advantageously, the stem is produced from one of the following materials: silicone elastomer, EPDM, nitrile, butyl, latex, thermoplastic elastomer, PE, PP, POM, PVC, EVA, SIS, SBS, SEBS, Hytrel®, Pebax®.

The invention also relates to a method for manufacturing an applicator as defined above, wherein the stem is produced by plastic injection moulding with a joint face following the profile of the stem.

Applicator Element

The applicator element may or may not have a rectilinear longitudinal axis.

The applicator element may comprise bristles and/or teeth that are oriented transversely, for example perpendicularly, to the longitudinal axis of the applicator element.

The applicator element may comprise a mascara brush.

The applicator element may also comprise a comb designed to apply a product to the keratin fibres, for example the eyelashes or eyebrows.

The applicator element may be produced with notches, for example.

The applicator element may be produced by plastic injection moulding, for example.

In a variant embodiment, the applicator element may comprise a pencil, in particular a pencil for the contour of the eyes.

The applicator element may also comprise a piece of foam, a sponge, a piece of felt or a flocked tip, being designed for example to apply a product to the lips or the eyelids. The applicator element may be flocked.

The applicator element may be able to hold product by capillary action.

The applicator element may have any geometric shape, preferably having a circular cross section, a small diameter and being symmetrical in all three directions.

The Gripping Member

In examples of applicators produced in accordance with the invention, the gripping member may have a body provided with an internal thread.

The gripping member may have an external shape having axial symmetry and may have, for example, a circular cross section along at least a part of its length.

The gripping member may be produced from a relatively rigid material such as a polyolefin.

The gripping member may be composed of three very lightly marked ergonomic outer surfaces (of the "tri-round" type) in order to optimize handling and make it easier to comb each of the three zones of the eyelash row (inner third, central third and outer third).

Container

Advantageously, the edges of the container are provided with a thread complementary to the thread on the gripping member.

Even more advantageously, the stem is designed to define a screwing direction identical to that of the gripping member.

Thus, the user will instantly understand in which direction to turn the gripping member in order to close the container.

The container and the applicator may be designed such that the stem of the applicator is prevented from pivoting in relation to the container when the applicator is in place on the latter.

Makeup Process

Advantageously, the cosmetic makeup process according to the invention consists in successively making up the three zones of the eye, that is to say the outer third, the central third and the inner third of the eye. These three zones relate to the upper eyelid and lower eyelid of each eye.

Even more advantageously, while the three zones are being made up, the direction of rotation of the gripping member is always the same for curling, lifting and extending the eyelashes. The manipulation of the applicator and the positioning of the applicator element are made easier and the makeup result is more reliable.

Figure 3:
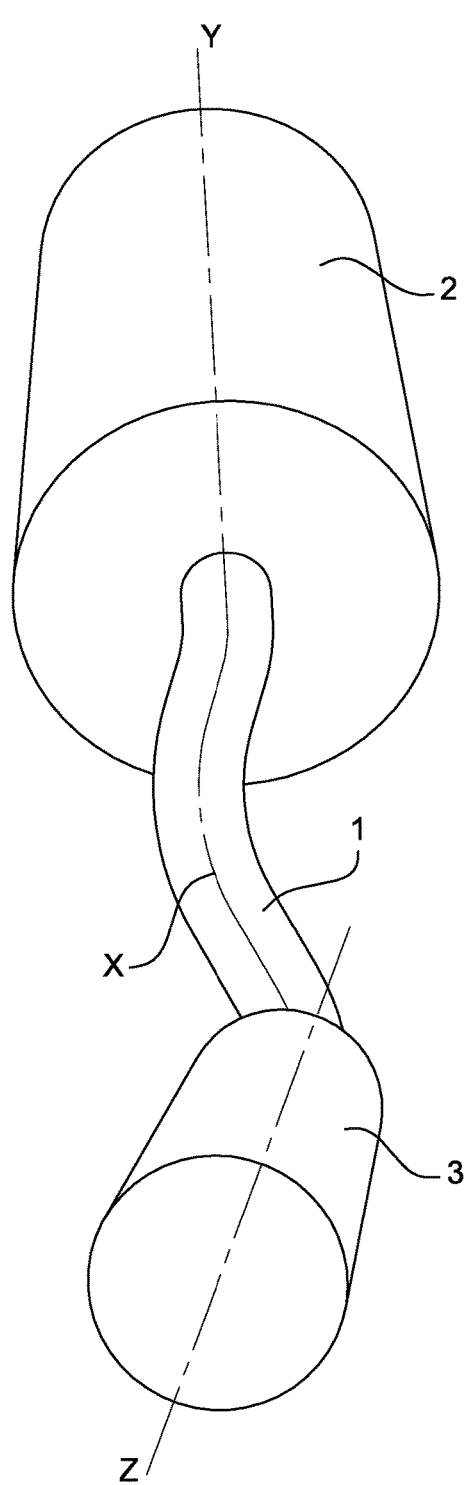
Figure 4:
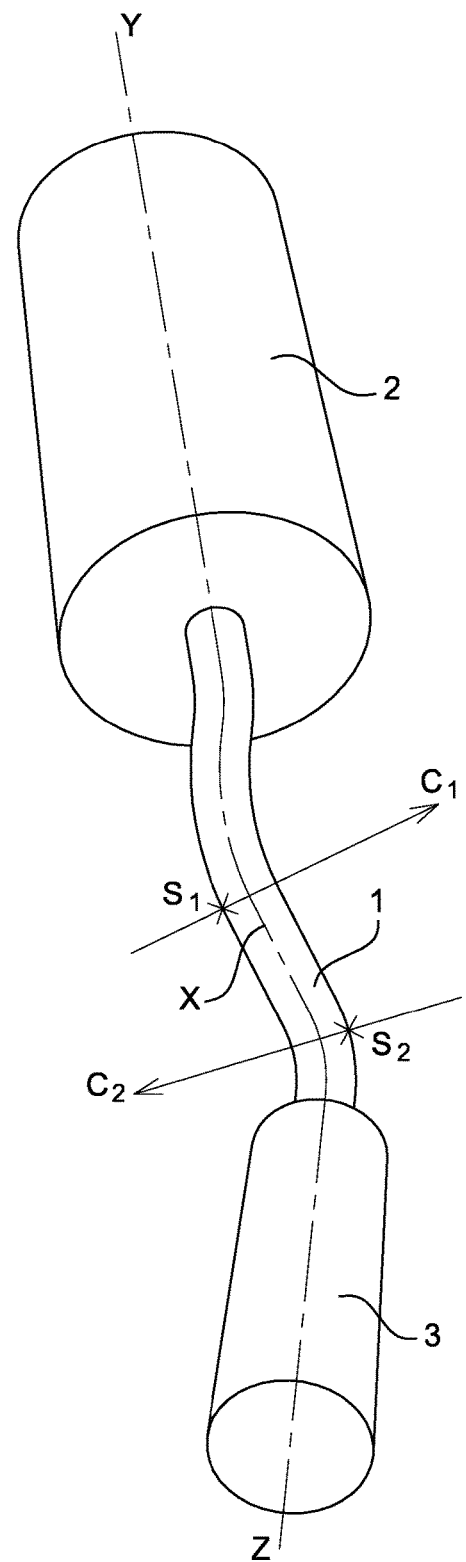
Figure 5:
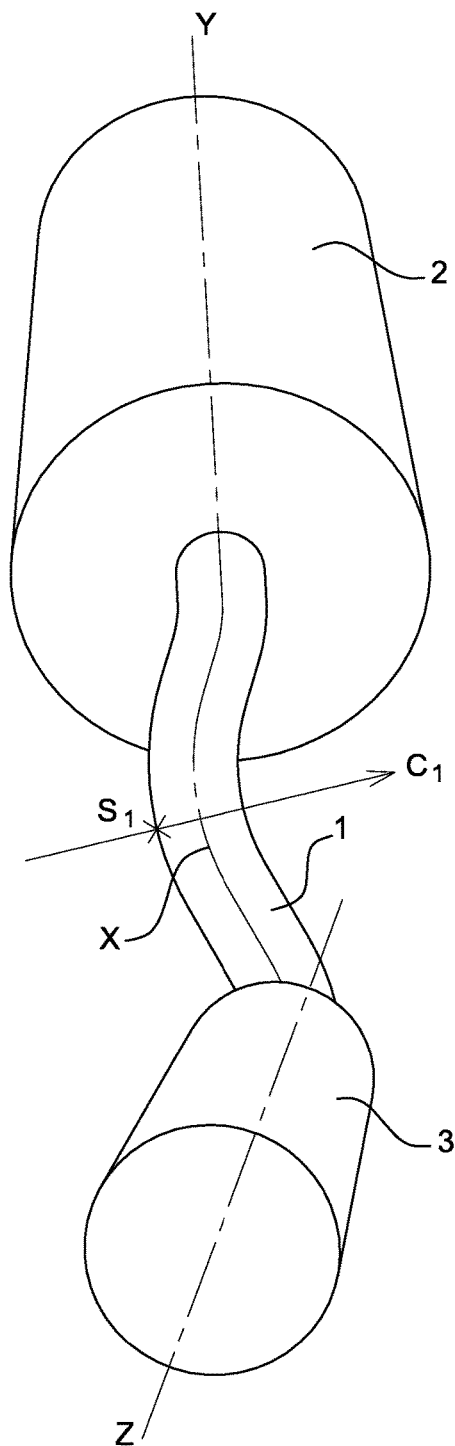
Figure 6:
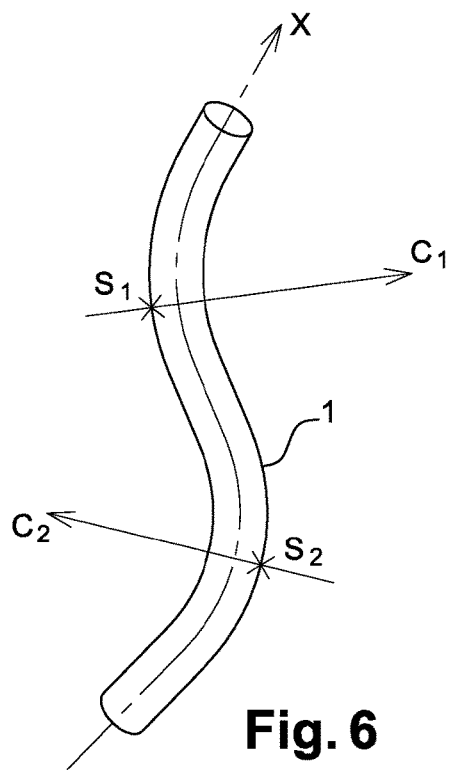
Figure 7:
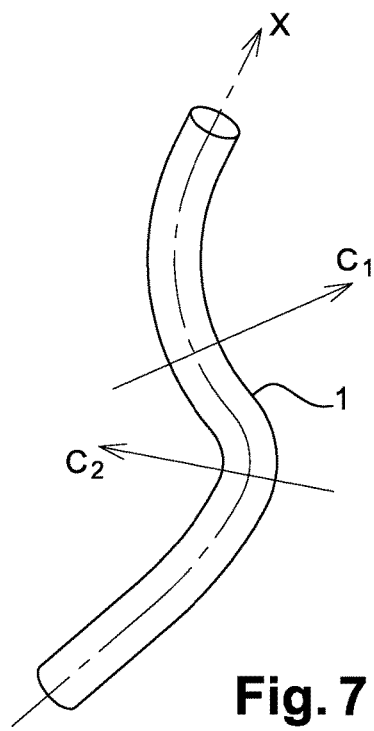
Figure 8:
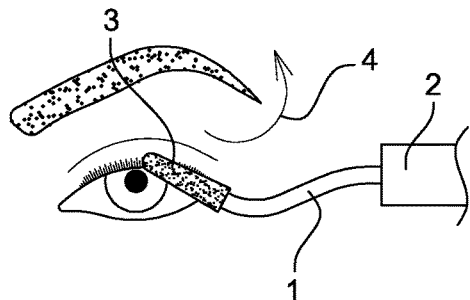
Figure 9:
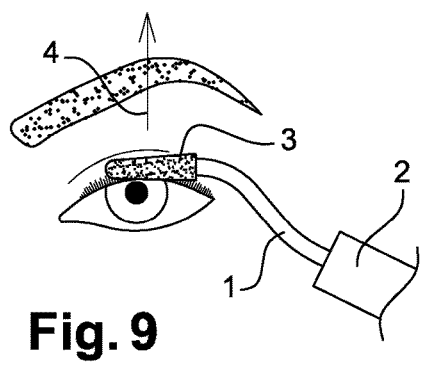
Figure 10:
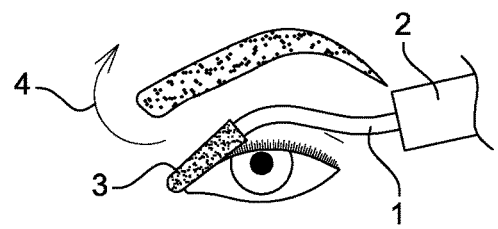
Figure 11:
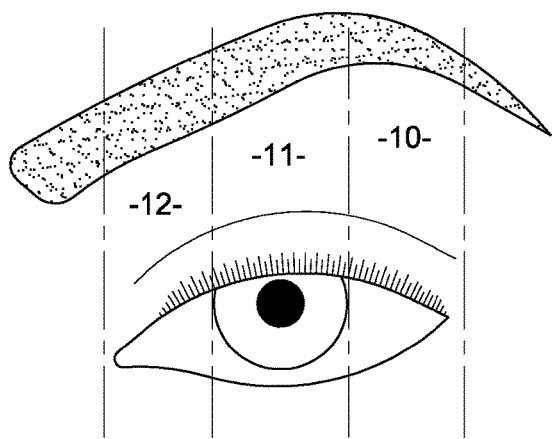

The invention may be better understood from reading the following detailed description of non-limiting implementation examples and from examining the appended drawing, in which:

FIG. 1 shows a schematic perspective view of an applicator produced in accordance with the invention in a first position, FIG. 2 shows a schematic perspective view of the applicator from FIG. 1 in a second position, FIG. 3 shows a schematic perspective view of the applicator from FIG. 1 in a third position, FIG. 4 shows a schematic perspective view of the applicator from FIG. 1 in a fourth position, FIG. 5 shows a schematic perspective view of the applicator from FIG. 1 in a fifth position, FIG. 6 illustrates a perspective view of a first stem of an applicator according to the invention and the position of its axis X, FIG. 7 illustrates a perspective view of a second stem of an applicator according to the invention and the position of its axis X, FIGS. 8 to 10 illustrate the makeup process for the eyelashes with the applicator according to the invention, FIG. 11 illustrates the various zones of the eye.

The applicator shown in FIGS. 1 to 5 is intended for the application of a product to the eyelashes or eyebrows, for example mascara. The applicator has a stem 1 having a non-rectilinear axis X. The axis X is obtained by connecting the centres of mass of the cross sections of the stem 1. The axis X describes a curve that extends in all three dimensions of space. This curve has a three-dimensional profile.

At its first end, the stem 1 is secured to a gripping member 2 having a rectilinear longitudinal axis Y. The gripping member 2 also forms a closure cap for a container containing the product to be applied. The gripping member 2 may be in the form of a cylinder of revolution, as illustrated, or as a variant have at least one flat.

At its second end, the stem 1 is secured to an applicator element 3 having a rectilinear longitudinal axis Z. The stem is designed such that the angle between the axis Y and the axis Z is greater than or equal to 25°. The applicator element 3 may have for example bristles or spikes.

The axis X of the stem 1 describes two bends. A first bend is produced about a first axis of curvature $C_1$ to a first radius of curvature $r_1$. A second bend is produced about a second axis of curvature $C_2$ to a second radius of curvature $r_2$. The radii of curvature are measured at the respective apices $S_1$ and $S_2$ of the two bends.

In the example described, the axes of curvature $C_1$ and $C_2$ are not parallel to one another.

Furthermore, the first radius of curvature $r_1$ is greater than the second radius of curvature $r_2$, the first axis of curvature $C_1$ being closest to the gripping member 2.

Starting from the gripping member 2, the axis X describes a first linear portion 12. The axis X is joined to the applicator element 3 by describing a second linear portion 13.

FIGS. 6 and 7 show the path of the axis X within the stem of two applicators according to the invention. The two applicators differ from one another by way of the curvature of the stem 1. As a result, the axes X of FIGS. 6 and 7 define different curves.

The cosmetic makeup process according to the invention consists in successively making up the outer third 10, the central third 11 and the inner third 12 of the eye. These three zones are shown in FIG. 11.

In order to use the applicator according to the invention, the person successively makes up the outer third, the central third and the inner third of the eye, on each of the two eyelids.

First of all, the person positions the applicator member 3 in contact with the eyelashes located in the outer third of the eye (FIG. 8). The concavity of the stem 1 closest to the applicator element 3 is then directed towards the eyebrows. She curls the eyelashes and lifts them forwards and upwards using the applicator element 3. She extends them towards the outer corner of the eye, as indicated by the arrow 4. The eyelashes are combed in their natural direction, each eyelash being normal to the contour of the eye or edge of the eye.

Next, the person proceeds to the central third of the eye (FIG. 9). She turns the gripping member 2, easily and naturally positioning the applicator element 3 horizontally. The concavity of the stem 1 closest to the applicator element 3 is then directed downwards. She curls the eyelashes and lifts them forwards and upwards using the applicator element 3 and she extends them upwards, as indicated by the arrow 4. The eyelashes are combed in their natural direction, each eyelash being normal to the contour of the eye or edge of the eye.

Finally, the person turns the gripping member 2 slightly, positioning the applicator element 3 in contact with the eyelashes of the inner corner (FIG. 10). The concavity of the stem 1 closest to the applicator element 3 is then directed downwards. She curls the eyelashes and lifts them forwards and upwards using the applicator element 3 and she extends them towards the inside, as indicated by the arrow 4. The eyelashes are combed in their natural direction, each eyelash being normal to the contour of the eye or edge of the eye.

For the bottom eyelashes, the pre-positioning and use movements (as described above, during making up) are symmetrical to those carried out for the top eyelashes.

The invention is not limited to the device specifically exemplified. Other devices, in particular those having stems that occupy all three dimensions of space by describing a quite different curve from that shown in the figures, are for example part of the invention.

The invention claimed is:

1. A cosmetic applicator comprising:
   a gripping member comprising an internal thread and having a longitudinal axis;
   an applicator element having a longitudinal axis; and
   a stem extending from the gripping member to the applicator element and formed of a polymeric material, the stem comprising:
   a first rectilinear portion that extends from the gripping member;
   a first curve extending from the first rectilinear portion and having a first radius of curvature and a first axis of curvature; and
   a second curve extending from the first curve toward the applicator element, the second curve having a second radius of curvature and a second axis of curvature, wherein,
   an axis of the stem that connects all centers of mass of cross sections of the stem cannot be contained in a single plane,
   the first radius of curvature is greater than the second radius of curvature, and
   the first and second curves are configured such that an angle formed between the longitudinal axis of the gripping member and the longitudinal axis of the applicator element-ranges from about 25° to about 90°.

2. The cosmetic applicator of claim 1, wherein the angle between the longitudinal axis of the gripping member and the longitudinal axis of the applicator element is about 90°.

3. The cosmetic applicator of claim 1, wherein:
   the first curve is concave toward a first side of the stem and the second curve is concave toward an opposite second side of the stem; and
   the first axis of curvature is not parallel to the second axis of curvature.

4. The cosmetic applicator of claim 1, wherein the longitudinal axis of the gripping member and the longitudinal axis of the applicator are both rectilinear.

5. The cosmetic applicator of claim 1, wherein the stem is elastically deformable.

6. A device for packaging and applying a cosmetic product, comprising:
   a container containing a cosmetic product; and
   an applicator comprising:
   a gripping member comprising an internal thread and having a longitudinal axis;
   an applicator element having a longitudinal axis; and
   a stem extending from the gripping member to the applicator element and formed of a polymeric material,
   wherein the stem comprises:
   a first linear portion that extends from the gripping member;
   a first curve extending from the first linear portion and having a first radius of curvature and a first axis of curvature; and
   a second curve extending from the first curve toward the applicator element, the second curve having a second radius of curvature and a second axis of curvature, wherein, an axis of the stem that connects all centers of mass of cross sections of the stem cannot be contained in a single plane, the first radius of curvature is greater than the second radius of curvature, and the first and second curves are configured such that an angle formed between the longitudinal axis of the gripping member and the longitudinal axis of the applicator element ranges from about 25° to about 90°.

7. A cosmetic process for making up the eyelashes or the contour of the eye lids, the process comprising:

providing the cosmetic applicator of claim 1, contacting the eyelashes and/or eyelids with the applicator element of the applicator.

8. The cosmetic process of claim 7, wherein the outer third of the eyelashes and/or eyelid, the central third of the eyelashes and/or eyelid, and the inner third of the eyelashes and/or eyelid are made up successively.

9. The cosmetic process of claim 8 wherein the step of contacting the eyelashes comprises rotating the gripping member;

wherein a direction of rotation of the gripping member is always the same for curling, lifting and extending the eyelashes.

\* \* \* \* \*